| United States Patent [19] | [11] Patent Number: 4,929,699 |
| Wilson et al. | [45] Date of Patent: May 29, 1990 |

[54] PROCESS FOR HYDROGENATION OF POLYMERS

[75] Inventors: David R. Wilson; James C. Stevens, both of Midland, Mich.

[73] Assignee: The Dow Chemical Company, Midland, Mich.

[21] Appl. No.: 349,549

[22] Filed: May 9, 1989

[51] Int. Cl.$^5$ ................................................ C08F 8/04
[52] U.S. Cl. ................................ 525/339; 525/332.8; 525/332.9; 525/333.1; 525/333.2; 525/338
[58] Field of Search ................................ 525/338, 339

[56] References Cited

U.S. PATENT DOCUMENTS

| 4,501,857 | 2/1985 | Kishimoto et al. |
| 4,668,773 | 5/1987 | Marks et al. |
| 4,673,714 | 6/1987 | Kishimoto et al. |
| 4,716,257 | 12/1987 | Marks et al. |
| 4,801,666 | 1/1989 | Marks et al. |

*Primary Examiner*—Bernard Lipman
*Attorney, Agent, or Firm*—Douglas N. Deline

[57] ABSTRACT

Ethylenically unsaturated polymers are hydrogenated by use of a bis(alkyl substituted cyclopentadienyl) lanthanide catalyst.

11 Claims, No Drawings

PROCESS FOR HYDROGENATION OF POLYMERS

BACKGROUND OF THE INVENTION

The present invention relates to a method for homogeneous catalytic hydrogenation of polymers containing ethylenic unsaturation. More particularly the present invention relates to a novel method for preferentially hydrogenating unsaturated bonds remaining in polymers of conjugated dienes.

Polymers obtained by polymerizing or copolymerizing conjugated dienes are widely utilized for commercial purposes. These polymers have unsaturated double bonds as residues in their polymer chain. While under some circumstances the unsaturated double bonds are advantageous such as for vulcanization purposes, they are a disadvantage as far as stability to weathering conditions and oxidation is concerned. In particular block copolymers obtained from conjugated dienes and monovinylidene aromatic monomers are highly useful items of commerce but find limited application in the preparation of impact resistant resins for use in exposed applications.

In U.S. Pat. Nos. 4,501,857 and 4,673,714 suitable homogeneous polymer hydrogenation catalysts comprising bis-(cyclopentadienyl)titanium compounds are disclosed.

It is additionally previously known in the art to use certain Ziegler-type catalysts in the hydrogenation of polymers. The catalysts are obtained by causing organic acid salts of nickel, cobalt, iron or chromium or acetyl acetone salts to react with a reducing agent such an organic aluminum compound in a solvent. Disadvantageously, it is known that such Ziegler-type catalysts suffer from a defect in selectivity as to the hydrogenation of unsaturated double bonds of conjugated diene units relative to aromatic unsaturation contained in vinyl aromatic units. Under the conditions which permit thorough hydrogenation of the unsaturated double bonds of the conjugated diene units, the aromatic nucleus portion of the copolymer is inevitably hydrogenated to some extent.

A class of bis(pentamethylcyclopentadienyl)lanthanide catalysts has recently been disclosed in U.S. Pat. Nos. 4,668,773, 4,716,257 and 4,801,666. Such organolanthanide catalysts are highly useful in the polymerization of olefins and also in the hydrogenation of simple olefins. However, the reference clearly points out that not all olefin compounds could be successfully hydrogenated through the use of such homogeneous organolanthanide catalysts. In particular, tetramethylethylene could not be hydrogenated at a measurable rate by any of the organolanthanide catalysts disclosed in the foregoing references.

For the teachings contained in the foregoing U.S. patents the same are hereby incorporated in their entirety by reference thereto.

SUMMARY OF THE INVENTION

According to the present invention there is provided a process for hydrogenation of a polymer containing ethylenic unsaturation comprising contacting the polymer with a bis(alkyl substituted cyclopentadienyl) lanthanide-based compound and a hydrogenating agent under hydrogenation conditions.

Surprisingly hydrogenation of polymers can be effected utilizing the foregoing bis(alkyl substituted cyclopentadienyl) lanthanide compounds in extremely high efficiencies without effecting hydrogenation of aromatic functionality which may be additionally present in the polymers.

DETAILED DESCRIPTION OF THE INVENTION

The bis(alkyl substituted cyclopentadienyl) lanthanide catalysts suitably employed according to the present invention correspond to the formula:

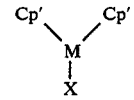

wherein
Cp' is an alkyl substituted cyclopentadienyl ligand-($\eta^5$—$R_5C_5$)), wherein R is hydrogen, $C_{1-16}$ alkyl (including inertly substituted alkyl) or silyl with the proviso that in at least one occurrence R is not hydrogen:
M is a lanthanide series element: and
X is an inert substituent capable of replacement by hydrogen under hydrogenation conditions.

By the term lanthanide series element is included La, Ce, Pr, Nd, Pm, Sm, Eu, Gd, Tb, Dy, Ho, Er, Tm, Yb and Lu. A preferred lanthanide series element is samarium, Sm. X in the above identified formula is preferably selected from the group consisting of $C_{1-16}$ alkyl (including inertly substituted alkyl), $C_{6-12}$ aryl, silyl, $C_{1-6}$ alkyl substituted silyl and hydrogen. Under hydrogenation conditions in the presence of a hydrogenating agent the foregoing catalysts are believed to result in the formation of the bis(alkyl substituted cyclopentadienyl) lanthanide hydride having the formula $[(\eta^5$—$R_5C_5)_2MH]_2$. Preferred inert substituents for the alkyl group above mentioned are silyl and $C_{1-6}$ alkyl substituted silyl. A most preferred X substituent is di(trialkylsilyl) methyl, having from 1 to 4 carbons in the alkyl group, ie. $CH(SiR'_3)_2$, wherein R' is $C_{1-4}$ alkyl. Most preferably X is di(trimethylsilyl)methyl.

The foregoing bis(alkyl substituted cyclopentadienyl) lanthanide catalysts may be readily prepared by reaction of the corresponding bis(alkyl substituted cyclopentadienyl) lanthanide halide complex with a lithium alkyl, -aryl, -silyl or -alkyl substituted silyl reactant. Corresponding hydrides are formed by contacting the same under mild conditions with hydrogen. Details of process conditions utilized in the preparation of the catalysts usefully employed according to the present invention are disclosed in the foregoing U.S. Pat. Nos. 4,668,773, 4,716,257 and 4,801,666.

Suitable hydrogenating agents for use according to the present invention include any composition which is effective for hydrogenating polymers under the reaction conditions herein employed. A preferred hydrogenating agent comprises gaseous hydrogen.

The present process may suitably be employed in the hydrogenation of all polymers containing ethylenic unsaturation. It is preferably applied to polymers obtained by polymerizing or copolymerizing conjugated dienes. It is further applicable to hydrocarbon polymers polymerized in the presence of an organic lithium compound and containing unsaturated double bonds and especially to living polymers of conjugated dienes obtained by polymerizing or copolymerizing conjugated dienes and containing lithium atoms in the polymer chains. These polymers and living polymers include homopolymers of conjugated dienes, interpolymers of different conjugated dienes, and copolymers obtained by copolymerizing at least one conjugated diene and at least one olefin monomer copolymerizable with that conjugated diene. The conjugated dienes which are usable for the production of such polymers and living polymers are generally conjugated dienes having four to about 12 carbon atoms. Concrete examples of such conjugated dienes having four to about 12 carbon atoms are 1,3-butadiene, isoprene, 2,3-dimethyl-1,3-butadiene, 1,3-pentadiene, 2-methyl1,3-pentadiene, 1,3-hexadiene, 4,5-diethyl-1,3octadiene, and 3-butyl-1,3-octadiene. With a view to producing elastomers excelling in physical properties and permitting industrially advantageous developments, 1,3-butadiene and isoprene prove to be particularly desirable conjugated dienes. These polymers are not particularly discriminated by microstructures of their polymer chains: they may be invariably used advantageously no matter what microstructures their polymer chains may possess. If these polymers do not have sufficient 1,2-vinyl bonds, however, their products of hydrogenation exhibit lower solubility than are desirable and the polymers themselves may require use of specific solvents for uniform hydrogenation. Thus, the polymers are desired to contain the aforementioned bonds in an amount of at least about 30 percent.

The method of the present invention is used particularly advantageously for the hydrogenation of copolymers of living copolymers which are obtained by copolymerizing at least one conjugated diene and at least one monomer copolymerizable with that conjugated diene. Examples of the conjugated diene used advantageously for the production of such copolymer or living copolymer are those conjugated dienes enumerated above. As examples of the monomer used for copolymerization with the conjugated diene all the monomers which are copolymerizable with conjugated dienes may be cited. Among the monomers satisfying this requirement, vinyl-substituted aromatic hydrocarbons are particularly desirable. To be more specific, for the purpose of obtaining commercially useful, highly valuable elastomers and thermoplastic elastomers by making the most of the effect of this invention in the selective hydrogenation of the unsaturated double bonds in conjugated diene units, copolymers of conjugated dienes and vinyl-substituted aromatic hydrocarbons are particularly important. Concrete examples of the vinyl-substituted aromatic hydrocarbon usable advantageously in the production of such copolymers include styrene, t-butyl styrene, α-methyl styrene, o-methyl styrene, p-methyl styrene, divinyl benzene, 1,1-diphenyl ethylene, and vinyl naphthalene. Among the vinyl-substituted aromatic hydrocarbons, styrene proves especially advantageous. Concrete examples of the copolymer are diblock and triblock polymers of butadiene/styrene and isoprene/styrene. These copolymers are the best choices because they give rise to hydrogenated copolymers of high industrial value.

These copolymers or living copolymers are desired to contain vinyl-substituted aromatic hydrocarbons in amounts in the range of 5 percent by weight to 95 percent by weight. If they contain vinylsubstituted aromatic hydrocarbons in any amount outside the range specified above, they do not easily acquire the characteristics inherent in thermoplastic elastomers.

The copolymers or living copolymers for which the method of this invention is intended embrace random copolymers having monomers thereof statistically distributed throughout the polymer chains thereof, tapered block copolymers, complete block copolymers, and graft copolymers. For the purpose of producing a commercially useful thermoplastic elastomer, block polymers containing at least one conjugated diene polymer block and at least one vinyl-substituted aromatic hydrocarbon polymer block are particularly important. In the block copolymers satisfying this requirement, those which contain vinyl-substituted aromatic hydrocarbon polymer blocks in amounts in the range of 10 percent by weight to 90 percent by weight based on the total weights of the polymers involved are particularly advantageous. These block copolymers do not easily produce thermoplastic elastomers or thermoplastic resins of good physical properties if their vinyl-substituted aromatic hydrocarbon polymer block contents fall outside the range specified above.

The vinyl-substituted aromatic hydrocarbon polymer block content (a) is determined by the method reported in L. M. Kolthoff et al., J. Polymer Sci., Vol. 1, page 429 (1946) and this content (a) is reported as the concentration of the block polymer in the whole amount of a polymer under test.

The aforementioned block polymer may be in a form having a small amount of conjugated diene in a vinyl-substituted aromatic hydrocarbon polymer block. Block copolymers of this class embrace block copolymers of the straight-chain type, the so-called branched type involving partial coupling with a coupling agent, the radial type, and the star-shaped type.

The polymers to be used in the hydrogenation by the method of this invention are not particularly discriminated by the molecular weights of such polymers. Generally, however, they are required to have number average molecular weights in the range of about 1,000 to about 4,000,000. Polymers to be used are produced by any of the methods known to the art, such as, for example, the anionic, the cationic, coordination or free radical polymerization methods. They may be prepared by mass, solution, emulsion or a combination thereof. Among the polymers, polymers obtained by anionic techniques using a organic lithium compound as a catalyst therefor are particularly advantageous. As the polymerization catalyst in the manufacture of such living polymers, hydrocarbon compounds having at least one lithium atom bonded in the molecular units thereof are used. Examples of such hydrocarbon compounds are monolithium compounds such as n-propyl lithium, isopropyl lithium, n-butyl lithium, sec-butyl lithium, tert-butyl lithium, n-pentyl lithium and benzyl lithium, and dilithium compounds such as 1,3- or 1,4-bis-(1-lithio-2,3-dimethylpentyl)-benzene, 1,3- or 1,4-bis-(1-lithio-3-methylpentyl)-benzene, and 1,3-bis-(1-lithio-1-phenyl-3-methylpentyl)-benzene. The polymerization catalysts may be lithium oligomers and α,ω-dilithium oligomers which are obtained by such organic lithium compounds. Among the polymerization catalysts, n-butyl lithium and sec-butyl lithium prove particularly popular. These organic lithium compounds may be used either singly or in the form of mixtures consisting of two or more members. Such a polymerization catalyst may be added to the reaction system all at once or separately in two or more divided portions during the course of the polymerization. The amount of such an organic lithium compound may be suitably selected depending on the molecular weight of the polymer desired to be obtained.

Generally, this amount is in the range of 0.005 to 5 mol percent based on the total amount of all monomers used.

The hydrogenation contemplated by the present invention is desirably carried out in a solution of the given polymer in an inert organic solvent. The term "inert organic solvent" means a solvent which does not detrimentally react with any of the substances participating in the hydrogenation reaction. Examples of suitable solvents include aliphatic hydrocarbons such as n-pentane, n-hexane, n-heptane, n-octane, alicyclic hydrocarbons such cyclohexane, cycloheptane, and aromatic solvents such as toluene, xylene, and ethylbenzene. The foregoing solvents may used either alone or in the form of mixtures.

Preferably the hydrogenation is carried out with the given polymer in a concentration of from 1 to 50 percent by weight, preferably 3 to 25 percent by weight based on the amount of solvent used. Generally the hydrogenation is accomplished by keeping the polymer optionally in solution as previously described at a prescribed temperature in the presence of the hydrogenating agent and the hydrogenation catalyst for a sufficient period of time to effect the desired degree of hydrogenation. Preferably the polymer or polymer solution is kept in an agitated state while hydrogen gas optionally under an increased pressure is added to the mixture. Preferred temperature limits for the foregoing hydrogenation are from 0° to 100° C, most preferably from 25° to 75° C. Hydrogenation times on the order of 0.5 to 24 hours, preferably from 2 to 8 hours are employed. A pressure in the use of a hydrogen hydrogenating agent from about 20 to 400 pounds per square inch gauge, preferably from 100 to 400 pounds per square inch gauge is employed. As is previously known in the art a suitable inert atmosphere is generally provided during the hydrogenation.

The polymer to catalyst weight ratio suitably employed according to the present invention is from 15 to 50,000, most preferably from 50 to 5,000. Utilizing ratios in excess of the foregoing may result in incomplete hydrogenation of the polymer while utilizing excessive catalysts leads to economic inefficiency.

The hydrogenation may be carried out according to any known method such as a batch or continuous hydrogenation process. The progress of the hydrogenation may be determined throughout the course of the reaction by tracing the rate of disappearance of hydrogenating agent or the amount of hydrogen absorbed by the polymer solution. Generally there can be obtained a hydrogenated polymer in which at least 50 percent and preferably at least 90 percent of the unsaturated double bonds present therein have undergone hydrogenation.

The hydrogenated polymer may be recovered from the hydrogenation process and residual catalyst may be removed if necessary and the hydrogenated polymer easily isolated. One technique involves adding to the polymer solution a polar solvent such as acetone or alcohol which serves as a poor solvent for the hydrogenated polymer thereby causing precipitation thereof. Alternatively hot water may be added to the reaction mixture thereby recovering the hydrogenated polymer in conjunction with the solvent by an azeotropic distillation. Alternatively the polymer may be recovered by directly heating the reaction solution thereby removing the solvent by distillation.

The hydrogenated polymers which are obtained by the method of the present invention are usefully employed as elastomers or thermoplastic resins which excel in resistance to weather conditions or to oxidation. By incorporation of various additives such as ultraviolet ray absorbers, fillers, lubricants, pigments, additional elastomers or resins, the hydrogenated polymers find extensive utility in molding and extrusion applications.

Having described the invention the following example is provided as further illustrative and is not to be construed as limiting.

EXAMPLE 1

To 50 ml of cyclohexane are added 0.555 g polybutadiene and 0.01 g of bis(pentamethylcyclopentadiendienyl) (bis-(trimethylsilyl))methyl) samarium. The reactants are combined in a pressure reactor equipped with a feed for hydrogen addition and an agitator. The reactants are combined under inert atmosphere and the reactor is charged with hydrogen to a pressure of 400 pounds per inch gauge and heated to a temperature of 90° C. for about 3 hours. The reaction was discontinued and the reactor cooled. The polymer was isolated by evaporation of the solvent.

Analysis of the resulting polymer indicated residual unsaturation was hydrogenated to a percentage of about 99.5 percent as determined by NMR spectroscopy.

What is claimed is:

1. A process for hydrogenation of a polymer containing ethylenic unsaturation comprising contacting the polymer with a bis(alkyl substituted cyclopentadienyl) lanthanide-based compound and a hydrogenating agent under hydrogenation conditions.

2. A process according to claim 1 wherein the bis(alkyl substituted cyclopentadienyl) lanthanidebased compound corresponds to the formula

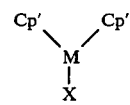

wherein
Cp' is an alkyl substituted cyclopentadienyl ligand-($\eta^5$—$R_5C_5$), wherein R is hydrogen, $C_{1-16}$ alkyl (including inertly substituted alkyl) or silyl with the proviso that in at least one occurrence R is not hydrogen:

M is a lanthanide series element: and

X is an inert substituent capable of replacement by hydrogen under hydrogenation conditions.

3. A process according to claim 2 wherein M is samarium.

4. A process according to claim 2 wherein X is $C_{1-16}$ alkyl, inertly substituted $C_{1-16}$ alkyl, silyl, $C_{1-6}$ alkyl substituted silyl or $C_{6-12}$ aryl.

5. A process according to claim 1 wherein the bis(alkyl substituted cyclopentadienyl) lanthanidebased compound is a bis(pentamethyl cyclopentadienyl) lanthanide.

6. A process according to claim 1 wherein the bis(alkyl substituted cyclopentadienyl) lanthanidebased compound is ($\eta^5$—$(CH_3)_5C_5)_2$Sm CH(Si(CH_3)_2$.

7. A process according to claim 1 wherein the hydrogenating agent is hydrogen.

8. A process according to Claim 1 wherein the polymer is a polymer of a conjugated diene.

9. A process according to claim 7 wherein the polymer is a homopolymer or copolymer of butadiene or isoprene.

10. A process according to claim 8 wherein the polymer is polybutadiene or a block copolymer of butadiene and a monovinylidene aromatic monomer.

11. A process according to claim 9 wherein the polymer is a block copolymer of styrene and butadiene.

* * * * *